March 3, 1936.  A. C. STEVENSON  2,032,511
ROAD VEHICLE
Filed Sept. 18, 1933   4 Sheets-Sheet 1

INVENTOR
Andrew C. Stevenson
BY
Cushman, Darby & Cushman
ATTORNEYS

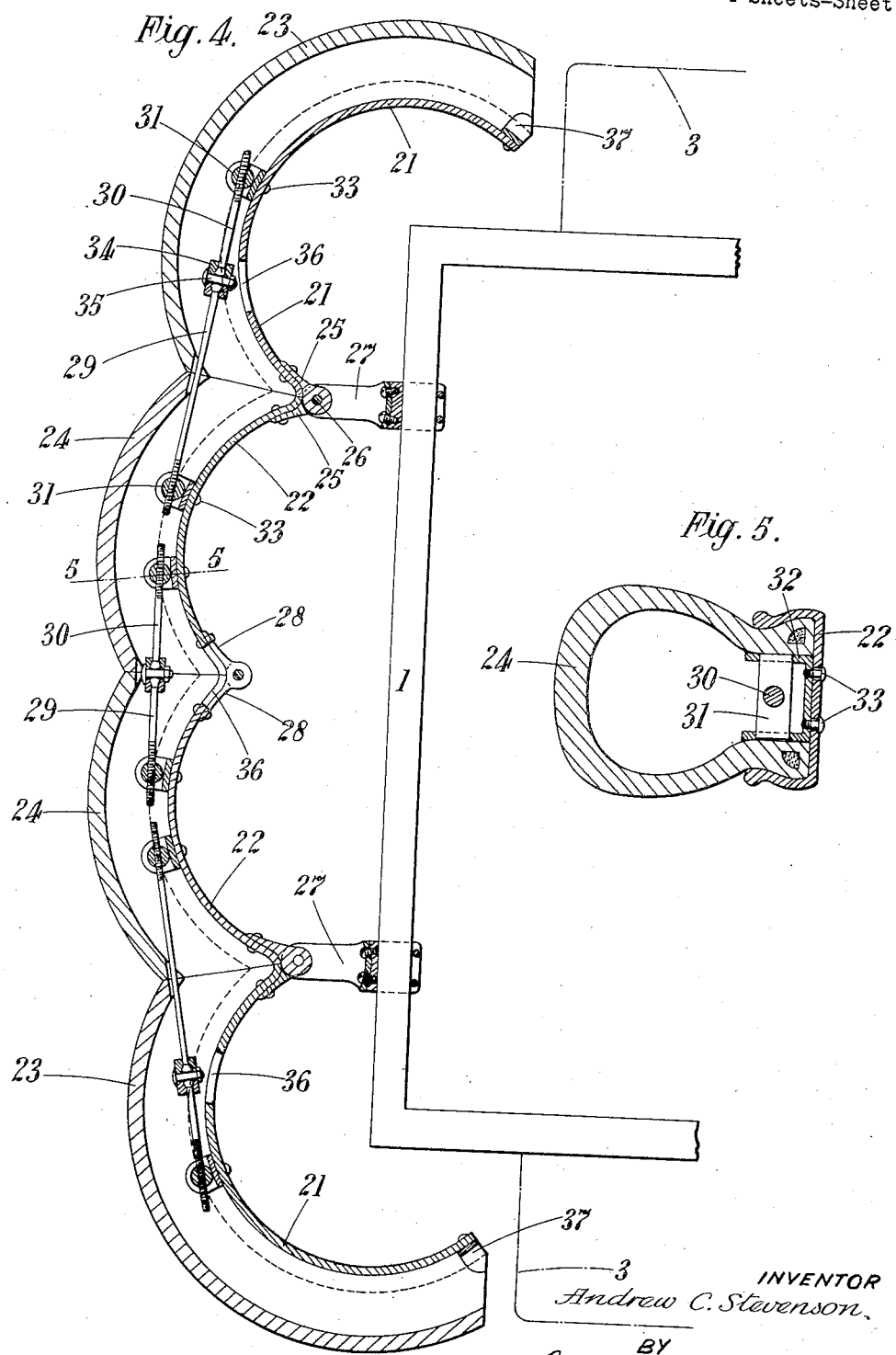
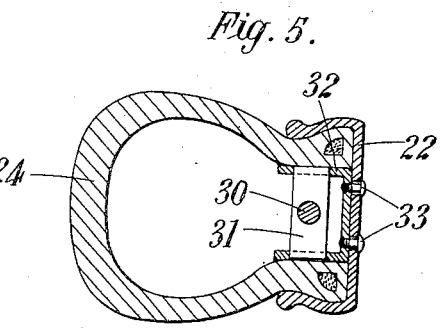

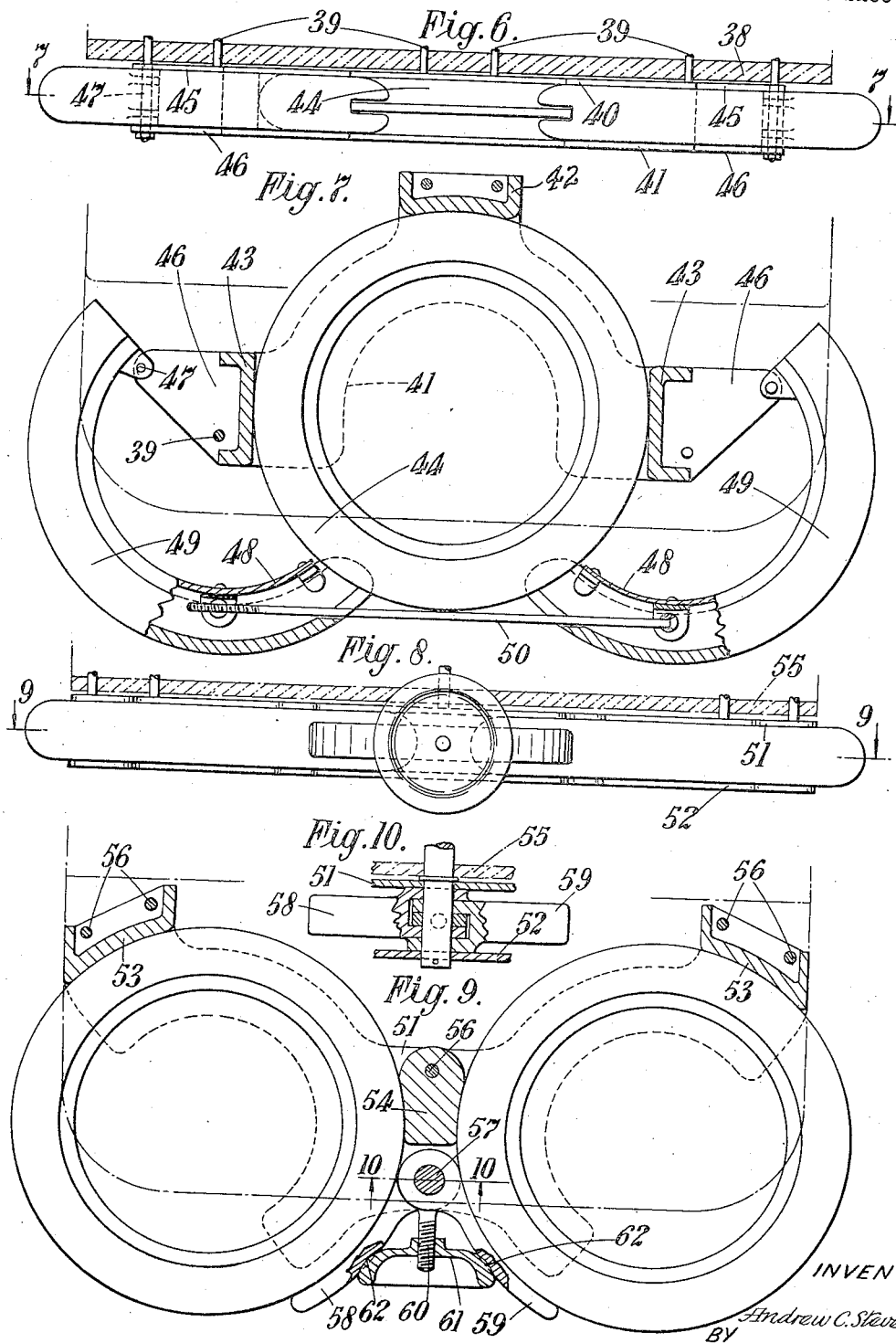

March 3, 1936.   A. C. STEVENSON   2,032,511
ROAD VEHICLE
Filed Sept. 18, 1933    4 Sheets-Sheet 4
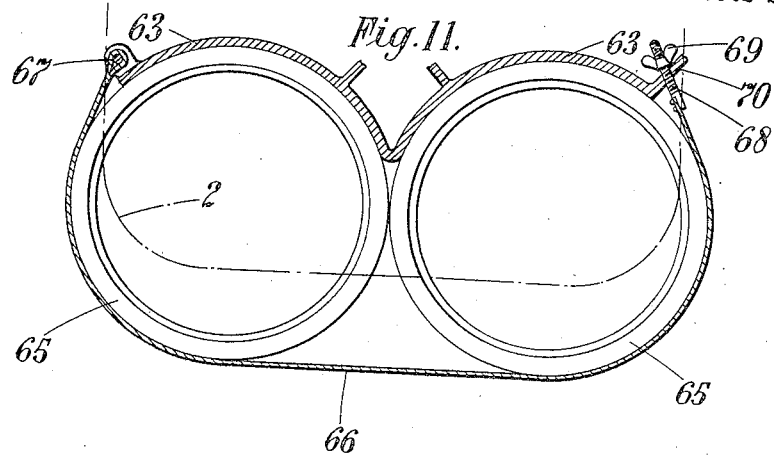
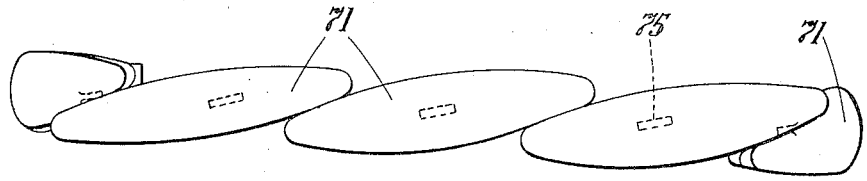
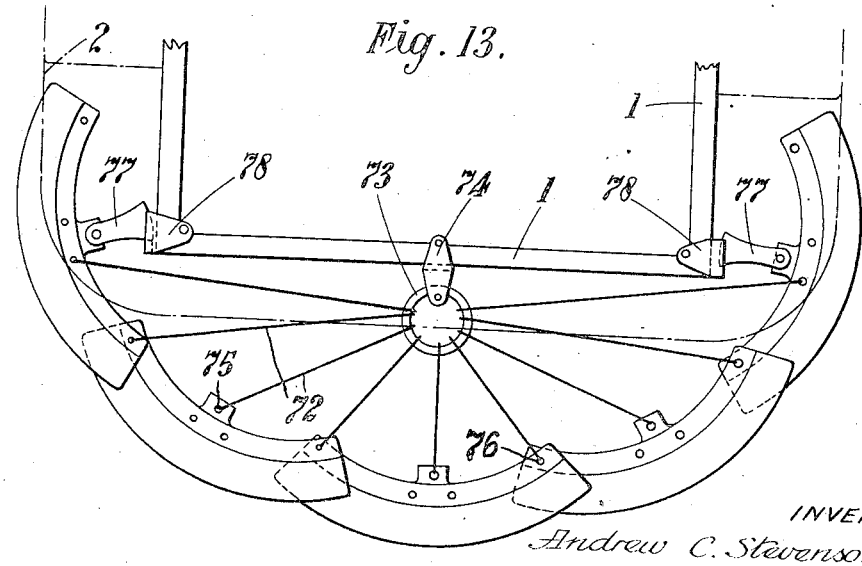
INVENTOR
Andrew C. Stevenson
BY
Cushman, Darby & Cushman
ATTORNEYS Patented Mar. 3, 1936

2,032,511

UNITED STATES PATENT OFFICE 2,032,511

ROAD VEHICLE

Andrew Creery Stevenson, Fleet, England

Application September 18, 1933, Serial No. 689,993
In Great Britain September 30, 1932

3 Claims. (Cl. 293—55)

This invention relates to road vehicles and more particularly to protective devices or "bumpers" on self-propelled vehicles.

According to one feature of this invention a device of the kind referred to comprises a resilient wheel tire or a portion or portions of such a tire or tires.

According to another feature of this invention a bracket or brackets are provided which can be attached to the frame or other rigid portions of the vehicle and are of such form that a tire or a portion or portions of a tire or tires can be readily attached to the bracket or brackets to serve as a "bumper".

The tire or portion of the tire employed may consist of the outer cover or a portion of the outer cover of an ordinary pneumatic tire such as used on self-propelled vehicles and such outer cover may consist of a "used" cover, that is to say one which is so worn as to be unsuitable for further use on a vehicle wheel. By the present invention therefore "used" tires which hitherto have been waste or scrap material can be utilized thus providing a cheap and effective bumper. If desirable an inflated tubular portion may be provided within the outer cover. Alternatively, an ordinary spare wheel may be so mounted on the vehicle as to serve as a bumper or in the case of tires formed in sections such as described, for example, in the specification of my prior application Serial No. 616522 and corresponding British Patent No. 380163 a number of such sections may be so mounted.

Various embodiments of the invention will now be described, by way of example, with reference to the accompanying drawings in which:—

Figure 1:
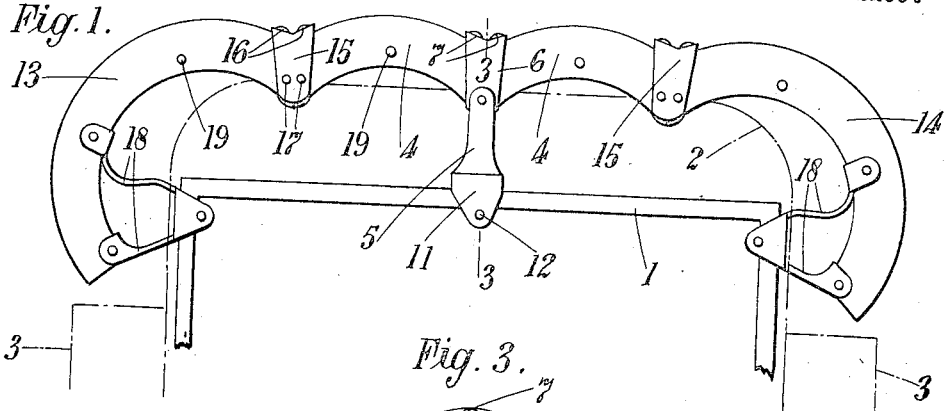
Figure 3:
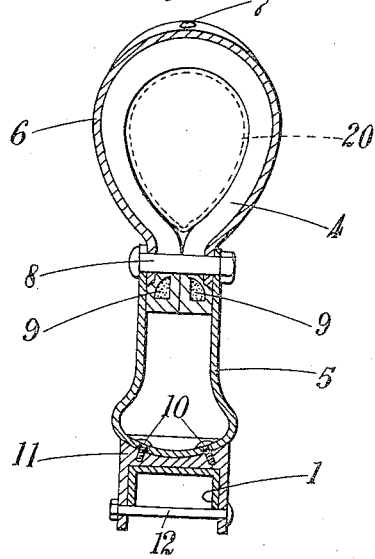
Figure 2:
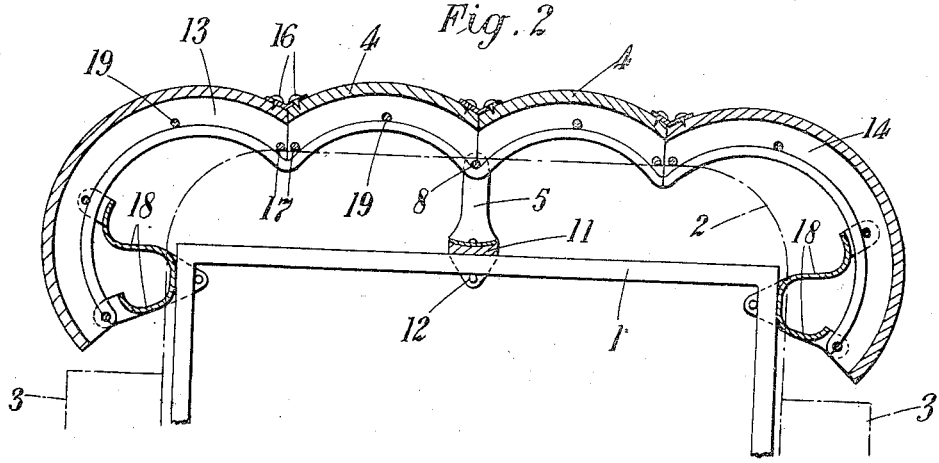

Fig. 1 is a plan view of one form of bumper according to this invention, a portion of the chassis to which the bumper is attached also being shown, Fig. 2 is a horizontal section of the same, Fig. 3 is a section on the line 3—3 in Fig. 1 on a larger scale, Fig. 4 shows another embodiment of the invention the view being similar to that shown in Fig. 2, Fig. 5 is a section on the line 5—5 in Fig. 4 on a larger scale, Fig. 6 shows an embodiment of the invention in which part of the complete bumper is formed by a spare wheel, the view being an end elevation, Fig. 7 is a section on the line 7—7 in Fig. 6, Fig. 8 shows another embodiment of the invention in which two spare wheels are used to form the bumper, the view being similar to Fig. 6, Fig. 9 is a section on the line 9—9 in Fig. 8, Fig. 10 is a section on the line 10—10 in Fig. 9, Fig. 11 is a horizontal section of a bumper in which two spare wheels are used, Fig. 12 is an end elevation of a bumper in which tire units such as described in my prior application Serial No. 616522 and corresponding British Patent No. 380163 are used, Fig. 13 is a plan view of the same.

Like numerals indicate like parts throughout the drawings.

Referring to Figs. 1 to 3, a portion of the main frame of the chassis of a self-propelled vehicle is shown at 1, the chain line 2 indicating the extent to which the body of the vehicle projects and the chain lines 3, 3 the mud guards. The portions 4, 4 of the bumper are formed from a single piece of the reinforced outer cover of a pneumatic tire, a V portion being cut away at the middle to enable it to take the form shown. The portions 4, 4 are supported from the frame 1 of the vehicle by a bracket member 5. Encircling the two portions 4, 4 over the V-cut is a metal band 6 which is secured to the two portions 4, 4 by screws 7, 7. The band 6 and the portions 4, 4 are secured in the bracket 5 by a bolt 8. The V-cut extends as shown in Fig. 3 down to the bolt 8 and the latter passes through the portions of cover 4, 4 just beyond the reinforcement 9, 9 in the cover. The bracket 5 is secured by screws 10, 10 to a part 11 which is clamped on the frame 1 by means of a bolt 12. The contacting surfaces of the bracket 5 and part 11 are of spherical form and the holes for the screws 10, 10 in the bracket 5 are of larger diameter than the screws, this allowing of adjustment of the position of the bracket 5 with respect to the frame 1.

The portions 13 and 14 of the bumper consist of portions of outer covers of a tire or tires. The inner ends of the portions 13 and 14 are connected to the portions 4, 4 by metal bands 15 secured to the portions of tire by screws 16 and bolts 17. The outer ends of the bumper portions 13 and 14 are supported by double armed brackets 18, 18 clamped to the frame 1 of the vehicle. Intermediate of the ends of the portions 4, 4, 13 and 14 the edges may be held together by bolts such as 19, 19.

To prevent sagging of the bumper between the points of support short lengths of metal tube or rings may be inserted within the portions 4, 4, 13, and 14. Such tubes or rings may be split parallel to the axis.

An inflated tube or tubes such as indicated by dotted lines 20 in Fig. 3 may be provided within the outer cover. The inflated tube or tubes consist of a portion or portions of an ordinary pneumatic tire inner tube or tubes the cut ends being sealed by the ordinary method as in repairing a puncture.

The exposed clamping and other metal portions may be nickel or chromium plated and the outer surface of the cover portions may be painted. The bumper can be readily attached to a vehicle and a new cover can be fitted by unskilled persons. At the same time a use is provided for worn outer covers.

In the embodiment of the invention shown in Figs. 4 and 5 which is more particularly adapted for larger sized vehicles the portions of outer cover are secured in portions of a metal wheel rim, the rim portions being secured to the frame of the vehicle. Such rim portions may be obtained from discarded wheels. The bumper consists of rim portions 21 and 22 to which are secured portions of tire cover 23 and 24 respectively. The rim portions are supported from the frame 1 of the vehicle by members 25, 25 fastened respectively to the two rim portions 21 and 22 by screws and hinged on a pin 26 in a bracket 27 secured to the frame 1 of the vehicle (the bracket 27 being similar to the bracket 5 in Figs. 1 to 3 and being similarly supported). The two central rim portions 22, 22 are connected together by members 28, 28 hinged together and secured to the rim portions by screws.

Instead of employing separate rim portions, two or more portions may be formed from a single portion of rim by cutting V-shaped portions away from the flanges on the rim at the position where the hinged members 25 or 28 are attached and bending the rim to the form required.

To stiffen the whole structure bracing members may be employed. These may consist of two rods 29, 30 which may be wheel spokes. The screw-threaded ends of these spokes are received in pins 31 rotatable in parts 32 (see particularly Fig. 5) secured to the rim by screws 33. The butt ends of the spokes are clamped together by a clamp consisting of two plates 34 adapted to be drawn together by a bolt 35, the ends of the spokes abutting against this bolt. To allow of easy access to the spokes openings are provided at 36 in the rim portions and also in the arms 28. By turning the spokes so that the screws in the pins 31 move before clamping the butt ends together the bracing effect can be adjusted as required. For stiffening the outer ends of the bumper channel-shaped members 37 (similar to the part 32 shown in Fig. 5) are provided. Such channel-shaped members may be provided at other positions along the lengths of the rim portions.

In the embodiment of the invention shown in Figs. 6 and 7 the bumper embodies a spare wheel and two rim and tire portions. Secured to the chassis 38 of the vehicle by bolts 39 is a skeleton box or frame consisting of top and bottom portions 40 and 41 connected together by parts 42, 43, 43. This box is adapted to receive a spare wheel 44. Between wing portions 45, 46 of the top and bottom plates 40 and 41 of the box, bolts 47 extend on which are pivoted portions 48 of wheel rim carrying portions 49 of tire outer cover. The bolts 47 may be secured to the chassis as shown, assisting the bolts 39 in supporting the skeleton box. The two portions 48 of tire rim are braced together by a rod 50 which may be a wheel spoke. The ends of the spoke are secured in members as hereinbefore described in connection with Figs. 4 and 5. By unscrewing the bracing member 50 the rim and tire parts 48 and 49 can be turned outwards so that the spare wheel can be removed or replaced.

In Figs. 8 to 10 an embodiment of the invention is illustrated in which two spare wheels or rims and tires are utilized to form the bumper. To receive the two wheels a skeleton frame or box is provided, this comprising upper and lower plates 51 and 52 with connecting portions 53, 53, and 54. This box is secured to the chassis 55 of the vehicle by bolts 56. Extending between the plates 51 and 52 is a pivot pin or shaft 57 on which are pivoted two members 58 and 59. Extending from the pin 57 is a screw 60 on which works a nut 61 adapted to bear against the members 58 and 59 and thus hold the spare wheels in position. By loosening the nut 61 from the screw 60 the members 58 and 59 can be swung round to allow either or both of the wheels to be removed or replaced.

Preferably the surfaces of the nut 61 and the members 58 and 59 where they bear against each other as at 62 are knurled so as to allow of the nut 61 being locked in position.

In Fig. 11 another embodiment of the invention is shown in which two spare wheels are held in position by means of a strap. The spare wheels fit into a box consisting as in the forms shown in Figs. 6 to 10 of upper and lower plates. These plates are joined together by a part 63. The part 63 is curved to the form of the wheels 65, 65. To hold the wheels in position a strap 66 which may be of metal, leather or other suitable material extends around them. The strap may be pivoted to one part 63 as at 67 and be provided with a screw 68 with a wing nut 69 at the other end. The screw 68 is adapted to engage a U-shaped projection 70 on the other part 63 thus allowing of quick and simple release.

With this form of bumper if the vehicle is struck a blow in the direction oblique to the fore and aft axis of the body of the vehicle, one tire presses on the other and so both serve to absorb the shock.

The embodiment of the invention shown in Figs. 8, 9 and 10 may be modified by omitting the parts 58 and 59 and the screw 60 and nut 61 and instead using two straps extending from the pin 57 around the two tires to the parts 53.

In the embodiment of the invention shown in Figs. 12 and 13, pneumatic tire units are used to form the bumper. The tire units shown are such as described in connection with Figs. 12 to 14 of my prior application Serial No. 616,522 and corresponding British Patent No. 380,163. The units 71 overlap each other and are supported from the frame 1 of the vehicle by bracing wires or rods 72. The wires 72 are secured at one end to a ring 73 held on a part 74 clamped to the frame 1 and at the other end are secured to the existing lugs 75 and holes 76 in the tire units. At the sides of the frame brackets 77 may be provided these being formed with spherical seatings on parts 78 clamped to the frame as hereinbefore described in connection with Figs. 1 to 5.

The form of the bumper shown in Figs. 12 and 13 may in addition be used as a luggage carrier and if necessary bracing wires may be provided extending from the tire units upwards to any suitable part of the vehicle.

By employing spare wheels or sections of wheels as bumpers, the usual fittings or spaces for carrying such spares are dispensed with thus giving a neater appearance to the vehicle.

The constructions of bumper hereinbefore described are adaptable for vehicles of different sizes and of different contours as the form of the bumper can be readily changed and the desired length obtained by adding or removing one or more sections.

Bumpers according to this invention may be arranged at the sides of a vehicle the use of tire sections being particularly adapted for this purpose.

The various embodiments of the invention hereinbefore described are given merely by way of example it being obvious that the invention can be carried into effect in various other ways.

I claim:—

1. A bumper for a road vehicle comprising a plurality of vehicle tire segments, each segment being fixed to the vehicle slightly inclined to the horizontal, the centers of said segments lying in a substantially common horizontal plane and being spaced apart a distance less than the length of the tire segment, to provide an impact surface relatively wide in a vertical plane.

2. A bumper for a road vehicle comprising a plurality of vehicle tire segments, each segment being slightly inclined to the horizontal, to provide an impact surface relatively wide in a vertical plane, the centers of said segments lying in a substantially common horizontal plane and being spaced apart a distance less than the length of the tire segment, the concave side of each segment being faced toward the vehicle to position the ends of each segment inwardly of the initial impact surface of the bumper.

3. A bumper for a road vehicle comprising a plurality of vehicle tire segments, spaced rods securing each segment to the vehicle, said rods being directed radially from the vehicle to the segments and being closely spaced in a plane beneath the upper edge of said segments to form substantially a surface constituting a luggage carrier.

ANDREW CREERY STEVENSON.